United States Patent
Nakasato

(10) Patent No.: US 8,442,376 B2
(45) Date of Patent: May 14, 2013

(54) IMAGE DATA RECORDING/PLAYBACK DEVICE, SYSTEM, AND METHOD

(75) Inventor: Kouta Nakasato, Kawasaki (JP)

(73) Assignee: Fujitsu Semiconductor Limited, Yokohama (JP)

(*) Notice: Subject to any disclaimer, the term of this patent is extended or adjusted under 35 U.S.C. 154(b) by 1136 days.

(21) Appl. No.: 12/104,064

(22) Filed: Apr. 16, 2008

(65) Prior Publication Data

US 2008/0267597 A1  Oct. 30, 2008

(30) Foreign Application Priority Data

Apr. 25, 2007 (JP) ................................ 2007-115573

(51) Int. Cl.
*G06F 21/00* (2006.01)

(52) U.S. Cl.
USPC ........................................................ 386/219

(58) Field of Classification Search .................. 386/131, 386/219, 224
See application file for complete search history.

(56) References Cited

U.S. PATENT DOCUMENTS

| | | |
|---|---|---|
| 2005/0111835 A1 | 5/2005 | Friel et al. |
| 2007/0030905 A1* | 2/2007 | Cote ........................ 375/240.16 |
| 2007/0133021 A1* | 6/2007 | Lee et al. ........................ 358/1.9 |
| 2007/0258641 A1* | 11/2007 | Srinivasan et al. ............ 382/166 |

FOREIGN PATENT DOCUMENTS

| | | |
|---|---|---|
| EP | 1 069 764 A2 | 1/2001 |
| JP | 2001-36844 A2 | 2/2001 |
| JP | 2001-045436 A2 | 2/2001 |

* cited by examiner

*Primary Examiner* — Brandon Hoffman
*Assistant Examiner* — Anthony Brown
(74) *Attorney, Agent, or Firm* — Arent Fox LLP

(57) ABSTRACT

An image data recording/playback device, including a decoder that decodes image data encoded in a first format; and a transcoder capable of encoding image data, supplied from the decoder and encoded in the first format, into a second format whose compression rate is higher than the compression rate of the first format and outputting the image data encoded into a second format to the decoder and, of decoding image data supplied from the decoder and encoded in the second format, outputting it to the decoder, and alternately carrying out the encoding processing and the decoding processing, wherein: the decoder inputs/outputs image data encoded in the first and second format; and the decoder simultaneously inputs or outputs image data encoded in the first format when inputting or outputting image data encoded in the second format.

10 Claims, 5 Drawing Sheets

IMAGE DATA RECORDING/PLAYBACK DEVICE, SYSTEM, AND METHOD

CROSS-REFERENCE TO RELATED APPLICATIONS

This application is based upon and claims the benefit of priority from prior Japanese Patent Application No. 2007-115573, filed on Apr. 25, 2007, the entire contents of which are incorporated herein by reference.

BACKGROUND OF THE INVENTION

1. Field

The present embodiment relates to an image data recording/playback system.

2. Description of the Related Art

For example, a hard disc recorder, which records by storing image data supplied from the outside, such as a digital broadcast signal, etc., encoded in an MPEG2 format, in a hard disc drive (HDD) device, digital video disc (DVD) device, etc., as well as playing back (decoding) and outputting the stored image data, and more specifically, to an image data recording/playback device to which a transcoder is added, which carries out encoding and decoding in an H.264 format capable of encoding with higher efficiency than that of the MPEG2 format.

In a digital broadcast, a broadcast signal is encoded in the MPEG2 format. In addition, as performance improves in a storage device, such as a HDD device, DVD device, etc., an image data recording/playback system is becoming more popular for household use, which records by storing encoded image data in a storage device, as well as decoding and playing it back. The number of products of such an image data recording/playback system for personal use is extensive; however, they are required to be inexpensive, and therefore, their essential parts are incorporated into an LSI to reduce cost. As a result, the main circuits of an image data recording/playback system are implemented by using a standard LSI for a decoder of the MPEG2 format. Generally, a broadcast signal is processed after being divided into picture data and audio data; however, a description is given here on the assumption that image data includes picture data and audio data and image data processing includes picture data processing and audio data processing.

The standard LSI for a decoder currently in use is capable of realizing a function of decoding and playing back MPEG2 image data, an interface function with a storage device, such as a HDD device etc., a function of generating video signals, etc., as well as a chasing playback function for playing back image data being recorded from the beginning, a simultaneous recording/playback function for storing other image data supplied from the outside when playing back image data stored in a storage device, etc.

FIG. 1A is a diagram explaining the operation at the time of the chasing playback function in a system in which MPEG2 image data is stored in a storage device using a standard LSI for an MPEG2 decoder and FIG. 1B is a diagram explaining the operation at the time of the simultaneous recording/playback function.

As shown in FIG. 1A, an operation is carried out by a user in order to instruct chasing processing during the period of recording of MPEG2 image data. In accordance with this, the MPEG2 decoder reads the already recorded MPEG2 image data from the storage device, plays it back, and converts it into an output signal while continuing to record the MPEG2 image data.

As shown in FIG. 1B, an operation is carried out by a user in order to simultaneously record/playback in which MPEG2 image data input during playback of MPEG2 image data being recorded. In accordance with this, the MPEG2 decoder stores new MPEG2 image data in the storage device while continuing playback of MPEG2 image data.

On the other hand, a new encoding format is being considered, which can play back image data of higher quality having a higher compression rate than MPEG2, for example, the H.264 format. By encoding using this format, it is possible to encode the same image with a smaller amount of data and as a result, a longer recording can be stored when the storage capacity of the storage device is the same. Because of this, a new encoding format is being planned; however, the broadcast signal is encoded into the MPEG2 format and there is a problem that an LSI that carries out the processing by the new encoding format has a large-scaled circuit and is expensive. In addition, as described above, the standard LSI for an MPEG2 decoder is widely used and the standard LSI for an MPEG2 decoder is comparatively less expensive. In order to realize an image data recording/playback system that stores image data encoded in a format with a high efficiency at a low cost, an image data recording/playback system having a basic configuration as shown in FIG. 2 is being considered.

The image data recording/playback system shown in FIG. 2 has an MPEG2 decoder 1, an H.264 transcoder 2 that carries out encoding and decoding by the H.264 format, a storage device 3, such as a HDD device, DVD device, etc., and a CPU 4 that controls the system. There may be a case where MPEG2 decoder 1 has the function of CPU 4. The MPEG2 decoder 1 is configured by a standard LSI. An input image signal supplied from outside to MPEG2 decoder 1 is a digital broadcast signal or a digital image signal supplied from other digital image equipment, and it is MPEG2 image data encoded in the MPEG2 format. The H.264 transcoder 2 employs a semi-duplex system in which the H.264 encoding function and the H.264 decoding function do not operate at the same time taking into consideration the realization thereof of low cost.

When recording input image data, MPEG2 decoder 1 supplies input image data to H.264 transcoder 2. H.264 transcoder 2, after playing back the input image data using the MPEG2 decoding function, encodes the H.264 image data using the H.264 encoding function and outputs the H.264 image data to MPEG2 decoder 1. MPEG2 decoder 1 stores the H.264 image data supplied from H.264 transcoder 2 in storage device 3. When playing back the recorded image data, MPEG2 decoder 1 reads the H.264 image data from storage device 3 and supplies it to H.264 transcoder 2. H.264 transcoder 2 plays back the H.264 image data using the H.264 decoding function and outputs the played-back image data to MPEG2 decoder 1. MPEG2 decoder 1 converts the played-back image data supplied from H.264 transcoder 2 into an analog video output or a digital HD video output (HDMI) and outputs it.

As described above, the image data recording/playback system in FIG. 2 only stores the H.264 image data with a high compression rate in storage device 3. Due to this, it is possible to effectively use the storage capacity of storage device 3 and to record for a longer period of time.

As described above, the system in FIG. 2, in which transcoder 2 of the semi-duplex system is added to MPEG2 decoder 1, will not bring about a problem when carrying out normal recording and playback operations. However, as described above, the standard LSI for an MPEG2 decoder can realize the chasing playback function, the simultaneous recording/playback function, etc., and a system, in which MPEG2 image data is stored in a storage device using the standard LSI, has in general the chasing playback function, the simultaneous recording/playback function, etc. Because of this, the image data recording/playback system that stores H.264 image data in the storage device shown in FIG. 2 is also required to realize the same functions.

However, as shown in FIG. 1A and FIG. 1B, when the chasing playback or the simultaneous recording/playback are carried out, it is necessary to carry out recording and playback at the same time. In the system in FIG. 2, the H.264 image data is input/output to/from storage device 3, and therefore, it is necessary to carry out the recording and playback of H.264 image data at the same time, however, because H.264 transcoder 2 employs the semi-duplex system, it is not possible to carry out the processing at the same time. Because of this, with the system in FIG. 2, there is a problem in that the chasing playback function or the simultaneous recording/playback function cannot be realized.

As described above, a system, in which a transcoder of the semi-duplex system employing a second encoding format the compression rate of which is higher than that of a first encoding format is added, has a problem in that it is not possible to carry out recording and playback at the same time because the transcoder employs the semi-duplex system.

SUMMARY

It is an aspect of the embodiments discussed herein to provide an image data recording/playback device, including a decoder that decodes image data encoded in a first format; and a transcoder capable of encoding image data, supplied from the decoder and encoded in the first format, into a second format whose compression rate is higher than the compression rate of the first format and outputting the image data encoded into a second format to the decoder and, of decoding image data supplied from the decoder and encoded in the second format, outputting it to the decoder, and alternately carrying out the encoding processing and the decoding processing, wherein: the decoder inputs/outputs image data encoded in the first and second format; and the decoder simultaneously inputs or outputs image data encoded in the first format when inputting or outputting image data encoded in the second format.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

The features and advantages will be more clearly understood from the following description taken in conjunction with accompanying drawings, in which.

DESCRIPTION OF THE PREFERRED EMBODIMENTS

Figure 1A:
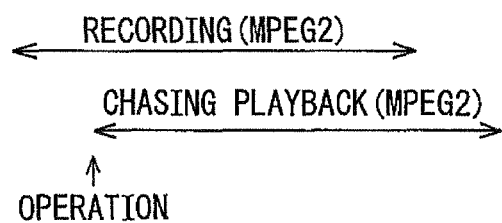
FIG. 1A and FIG. 1B are diagrams explaining a processing example in an image data recording/playback system without a conventional transcoder.
Figure 1B:
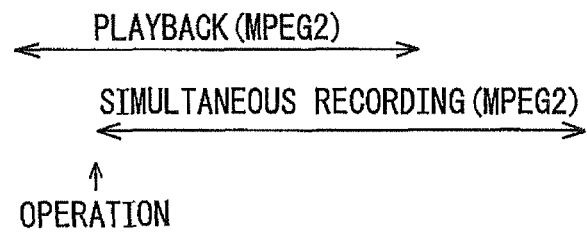
Figure 2:
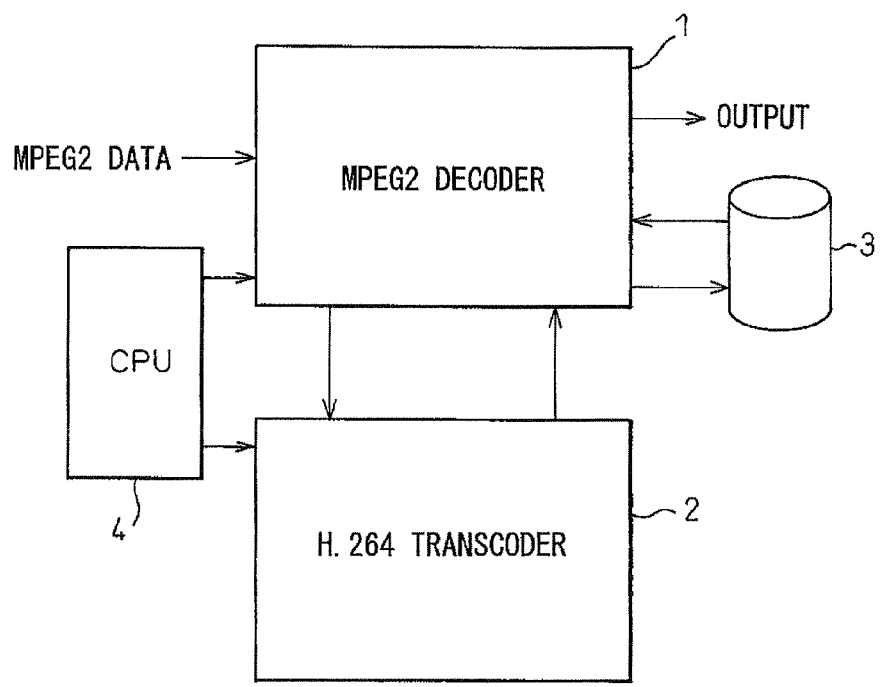
FIG. 2 is a diagram showing a basic configuration of an image data recording playback system having a transcoder.

As described above, in the system in FIG. 2, in order to effectively use the storage capacity of storage device 3, the image data stored in storage device 3 is only the image data (H.264 image data) encoded in the second format. As described above, the (MPEG2) decoder has the function of carrying out both recording and playback of the (MPEG2) image data at the same time, and because the encoding processing and decoding processing of the (H.264) image data are carried out by the transcoder, it is possible for the decoder to carry out the recording and playback of the (MPEG2) image data. In the embodiment, by using the recording and playback of the (MPEG2) image data, the chasing function, the simultaneous recording/playback function, etc., are realized. Because the storage device is used as a buffer of the (MPEG2) image data, when the operations of these functions are completed, the (MPEG2) image data stored in the storage device is deleted or invalidated.

When recording, the (MPEG2) image data supplied from outside is encoded into (H.264) image data in the transcoder and the decoder stores the (MPEG2) image data supplied from outside together with the (H.264) image data in the storage device. Then, when the chasing playback processing is carried out in accordance with an operation instruction, the decoder plays back the (MPEG2) image data stored in the storage device while storing the (H.264) image data and the (MPEG2) image data in the storage device. When the chasing playback processing is completed, the decoder deletes or invalidates the (MPEG2) video stored in the storage device for the chasing playback processing. Preferably, this processing is activated automatically. Due to this, what is stored in the storage device is only the (H.264) image data and it is unlikely that the use efficiency of the storage capacity of the storage device is degraded.

When recording is instructed and the simultaneous recording/playback is carried out during the period of playback of the (H.264) image data, the decoder once stores the (MPEG2) image data supplied from outside and encoded in the first format in the storage device and when the transcoder enter the standby state, it reads the stored (MPEG2) image data from the storage device and after encoding it into the (H.264) image data by the transcoder, it carries out the re-recording processing in which the (H.264) image data is stored in the storage device. Preferably, the re-recording processing is carried out while the transcoder is in the standby state and the (MPEG2) image data that is no longer necessary after the re-recording processing is deleted or invalidated. It is desirable that this processing be activated automatically.

Because the transcoder encodes supplied the (MPEG2) image data after playing it back, it is desirable to comprise a decoder to decode the (MPEG2) image data.

Embodiments are explained below specifically.

Figure 3:
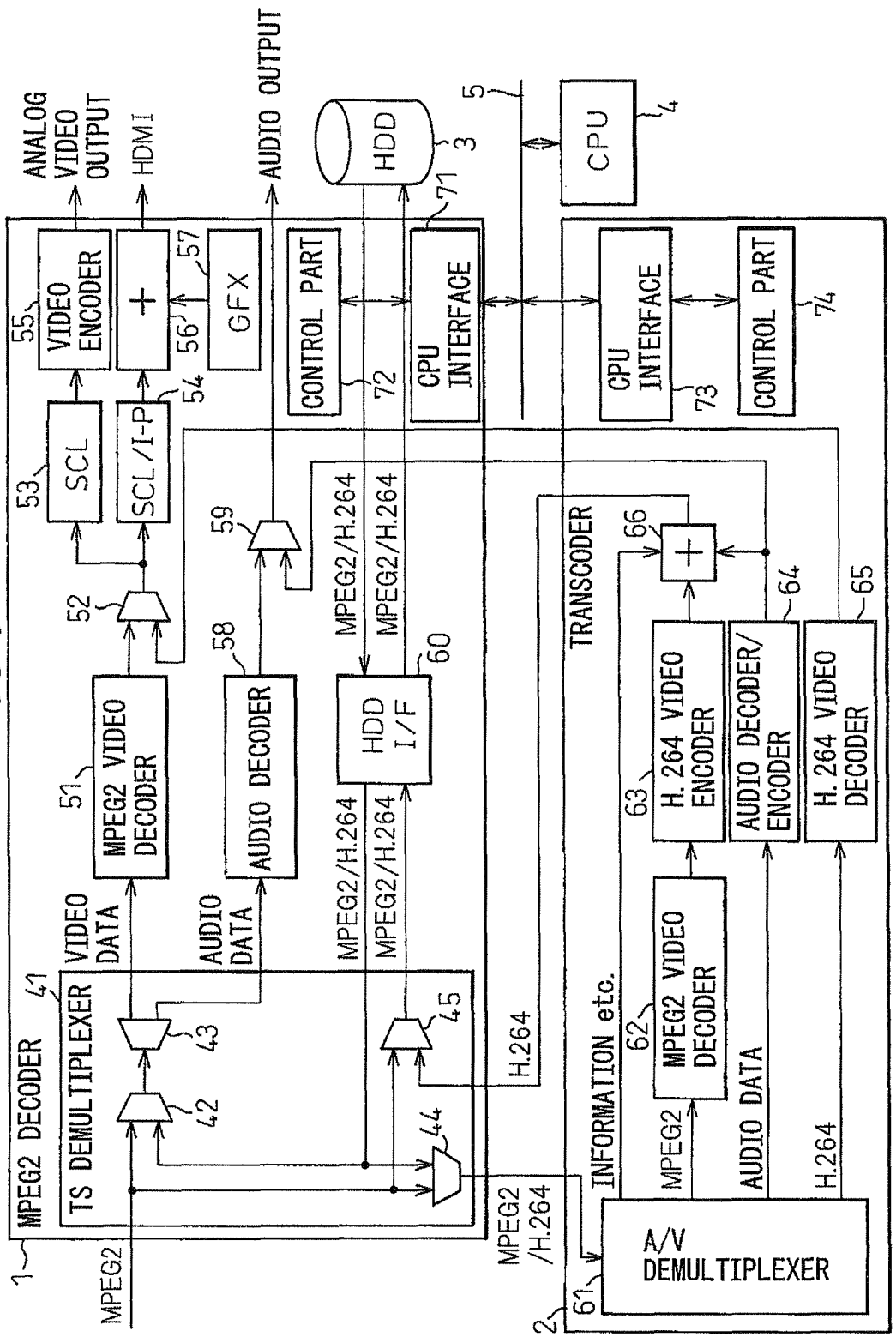
FIG. 3 is a diagram showing a configuration of an image data recording/playback system in an embodiment of the present invention.

FIG. 3 is a block diagram showing a general configuration of an image data recording/playback system (image data recording/playback device) in an embodiment. As shown schematically, the image data recording/playback system in the embodiment has, as in the system in FIG. 2, MPEG2 decoder 1, H.264 transcoder 2 of the semi-duplex system, storage device 3, such as an HDD device, DVD device, etc., and control CPU 4. In other words, the image data recording/playback system in the embodiment has the same hardware configuration as that of the system in FIG. 2. MPEG2 decoder 1 is configured by a standard LSI and H.264 transcoder 2 is also configured by an LSI.

As shown schematically, MPEG2 decoder 1 has a transport stream (TS) demultiplexer 41 that selects image data to be output, an MPEG2 video decoder 51 that decodes the video data of the MPEG2 image data output from TS demultiplexer 41 into normal video data, a multiplexer 52 that selects one of the normal image data output from MPEG2 video decoder 51 and the normal image data output from transcoder 2, a scaler (SCL) 53 that changes the magnification (scale) of the normal image data output from multiplexer 52, a scaler/I-P (SCL/I-P) 54 that carries out conversion of the magnification (scale) of the normal image data output from multiplexer 52 and interlace-progressive data conversion from interlaced data into progressive data, a video encoder 55 that generates an analog video output from the output of SCL 53, an adder circuit 56 that generates a digital high vision video output (HDMI) by combining the output of SCL/I-P 54 and the output of a graphics (GFX) 57, an audio decoder 58 that generates an audio output by decoding the audio data output from TS demultiplexer 41, a multiplexer 59 that selects one of the audio output from audio decoder 58 and the audio output from transcoder 2 and outputs it as an audio output, an HDD I/F (interface) 60 to input/output stored data between HDD 3 and TS demultiplexer 41, a CPU interface 71 to communicate with CPU 4 via bus 5, and a control part 72 to carry out the entire control of the decoder based on the signal from CPU interface 71. HDD I/F 60 is capable of causing HDD 3 to store the MPEG2 image data and the H.264 image data and of reading the stored MPEG2 image data and H.264 image data from HDD 3, and also capable of carrying out them simultaneously.

TS demultiplexer 41 has a multiplexer 42 that selects one of the MPEG2 image data input from outside and the (MPEG2 or H.264) image data output from HDD I/F 60, a demultiplexer 43 that separates video data and audio data from the image data of multiplexer 42, a multiplexer 44 that selects one of the MPEG2 image data input from outside and the (MPEG2 or H.264) image data output from HDD I/F 60, and a multiplexer 45 that selects one of the MPEG2 image data input from outside and the H.264 image data output from transcoder 2.

The MPEG2 decoder described above is the same as that used conventionally and therefore a further explanation is omitted.

Transcoder 2 has an A/V demultiplexer 61 that separates video data and audio data from the (MPEG2 or H.264) image data output from multiplexer 44, an MPEG2 video decoder 62 that decodes video data of the MPEG2 image data output from A/V demultiplexer 61 and generates normal video data, an H.264 video encoder 63 that encodes the normal video data output from MPEG2 video decoder 62 into the H.264 format and generates the (video data of the) H.264 image data, an audio decoder/encoder 64 that decodes or encodes the audio data output from A/V demultiplexer 61, an H.264 video decoder 65 that decodes the (video data of the) H.264 image data output from A/V demultiplexer 61, a multiplexer 66 that generates H.264 image data by integrating the processing information output from A/V demultiplexer 61, (video data of the) H.264 image data output from H.264 video encoder 63, and the audio data output from audio decoder/encoder 64 and outputs it to multiplexer 45, a CPU interface 73 to communicate with CPU 4 via bus 5, and a control part 74 that carries out the entire control of the transcoder based on the signal from CPU interface 73. Transcoder 2 employs the semi-duplex system in which the H.264 encoding function and the H.264 decoding function do not operate at the same time. Because the configuration of transcoder 2 is also known, further explanation is omitted.

Figure 4A:
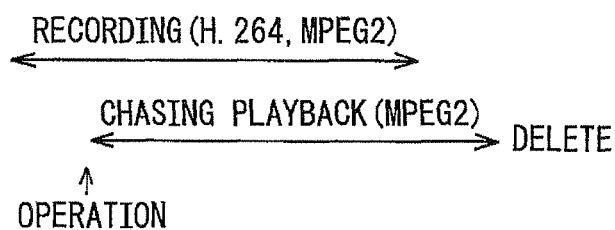
FIG. 4A to FIG. 4C are diagrams explaining a processing example in an embodiment.
Figure 4B:
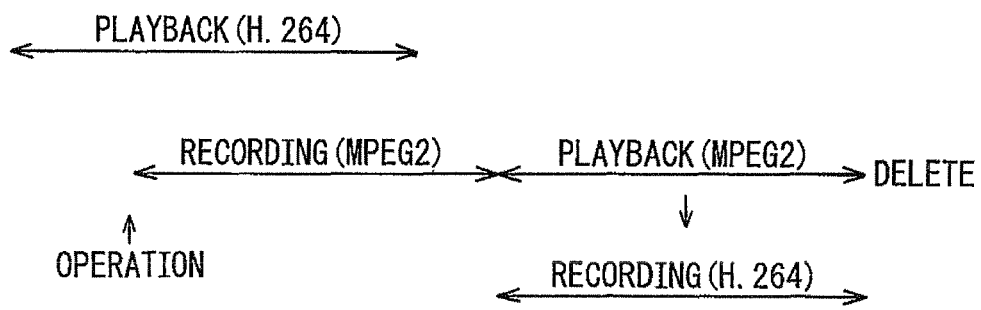
Figure 4C:
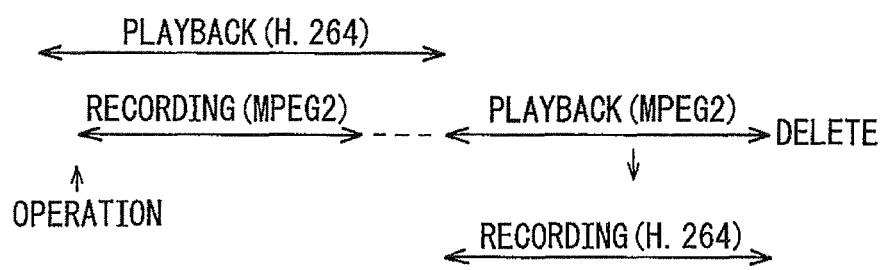

FIG. 4A to FIG. 4C are diagrams for explaining the processing operation in the system in the embodiment. A series of processing operations is controlled by CPU 4.

FIG. 4A shows a case of the chasing playback. As shown in FIG. 4A, when an operation to instruct to record external image data is carried out, the H.264 image data and the MPEG2 image data are stored in HDD 3.

In details, decoder 1 makes a setting so that multiplexer 44 selects MPEG2 image data from outside. Due to this, the MPEG2 image data from outside is supplied to A/V demultiplexer 61. A/V demultiplexer 61 supplies the MPEG2 video data of the MPEG2 image data to MPEG2 video decoder 62 and supplies the audio data of the MPEG2 image data to audio decoder/encoder 64. MPEG2 video decoder 62 converts the MPEG2 video data into normal video data and supplies it to H.264 video encoder 63. H.264 video encoder 63 encodes the normal video data into the H.264 video data. Audio decoder/encoder 64 encodes after converting into the normal audio data. Multiplexer 66 combines the H.264 video data from H.264 video encoder 63 and the encoded audio data from audio decoder/encoder 64 to generate the H.264 image data and supplies it to multiplexer 45.

Multiplexer 45 supplies the MPEG2 image data from outside and the H.264 image data from multiplexer 66 to HDD I/F 60 in a time-sharing manner and HDD I/F 60 stores both the MPEG2 image data from outside and the H.264 image data in HDD 3. This processing is carried out during the recording time afterward.

As described above, in the present embodiment, at the time of recording, both the MPEG2 image data from outside and the H.264 image data are stored in HDD 3. In this processing, transcoder 2 carries out the decoding processing from the MPEG2 image data from outside into the normal image data and the encoding processing into the H.264 image data; however, decoder 1 only carries out the processing of storing the MPEG2 image data from outside in HDD 3 as is but MPEG2 video decoder 51 and audio decoder 58 do not carry out the encoding processing for recording.

During the period of the above recording processing, if a user carries out an operation to instruct to play back the program being recorded from the first part of the recorded program, the chasing playback is started. In the chasing playback, at the same time of the above recording processing, the MPEG2 image data stored in HDD 3 is read and played back.

In detail, HDD I/F 60 reads the MPEG2 image data in the program being recorded from the first part at the same time of the storing processing for recording in HDD 3 and supplies it to demultiplexer 43. Demultiplexer 43 supplies the MPEG2 video data of the MPEG2 image data to MPEG2 video decoder 51 and the audio data to audio decoder 58. MPEG2 video decoder 51 decodes the MPEG2 video data into normal video data and supplies it to multiplexer 52. Multiplexer 52 supplies the video data to SCL 53 and SCL/I-P 54. After this, the video data is decoded and output in accordance with the form of the output. Audio decoder 58 decodes the audio data into normal audio data and supplies it to multiplexer 59. Multiplexer 59 outputs the audio data. After this, this processing is carried out until the recorded program comes to an end. As a result, if forwarding etc., is not carried out, the processing comes to an end when a period of time has elapsed after the recoding of the program is completed, the period of time being from the start of recording of the program to the start of the chasing playback.

As described above, the chasing playback processing is only the processing of decoder 1 and transcoder 2 is not involved. HDD I/F 60 carries out the writing of the MPEG2 image data from outside and the H.264 image data into HDD 3 and the reading of the MPEG2 image data from HDD 3 at the same time. As described above, the standard LSI for a decoder is capable of carrying out the writing to HDD 3 and the reading from HDD 3 at the same time, and capable of carrying out such processing.

When the chasing playback is completed, the MPEG2 image data in HDD 3 is deleted or invalidated so that it can be or overwritten later.

Figure 5A:
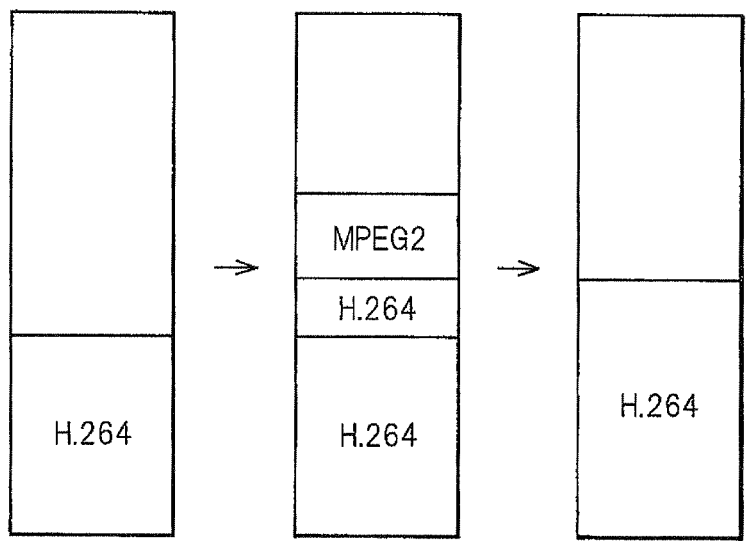
FIG. 5A and FIG. 5B are diagrams explaining the change of the stored contents in a storage device (HDD) in accordance with the processing example in the embodiment.

FIG. 5A is a diagram for explaining the change of the stored data in HDD 3 at the time of recording and chasing playback. At first, only the H.264 image data is stored in HDD 3. When the recording of a new program is started, in addition to the H.264 data stored so far, the H.264 image data and the MPEG2 image data of the new program are stored. If no operation to instruct the chasing playback is carried out by the time the recording is completed, the MPEG2 image data is deleted or invalidated when the recording is completed. If the operation is carried out to instruct the chasing playback during the period of recording, the reading is carried out at the same time of the storing of the MPEG2 image data. When the chasing playback is completed, the MPEG2 image data is deleted or invalidated. In this manner, after the recording and chasing playback are completed, the valid data stored in HDD 3 is only the H.264 image data and the MPEG2 image data is not stored.

FIGS. 4B and 4C show the processing operation at the time of the simultaneous recording and playback, where FIG. 4B shows the case where the playback of the program of the H.264 image data is completed earlier and then the recording of the program of the MPEG2 image data is completed, and FIG. 4C shows the case where the recording of the program of the MPEG2 image data started later is completed earlier and then the playback of the program of the H.264 image data is completed. As shown in FIGS. 4B and 4C, when the operation to instruct the playback of the H.264 image data stored in HDD 3 is carried out, the H.264 image data is read from HDD 3 and played back.

In detail, HDD I/F 60 reads the H.264 image data to be played back from HDD 3 and supplies it to multiplexer 44. Multiplexer 44 selects the H.264 image data and supplies it to A/V demultiplexer 61. A/V demultiplexer 61 supplies the H.264 video data of the H.264 image data to H.264 video decoder 65 and supplies the audio data of the H.264 image data to audio decoder/encoder 64. H.264 video decoder 65 decodes the H.264 video data into normal video data and supplies it to multiplexer 52. Audio decoder/encoder 64 decodes the audio data into normal audio data and supplies it to multiplexer 59. After this, an output is generated as in the chasing playback and the processing is carried out until the playback of the instructed program is completed.

During the period of the above playback processing, if a user carries out the operation to instruct the recording of another program, the simultaneous recording and playback is started. In the simultaneous recording and playback, at the same time of the playback of the H.264 image data stored in HDD 3, the MPEG2 image data from outside is stored in HDD 3 and when both the playback of the H.264 image data and the recording of the MPEG2 image data are completed and transcoder 2 enters the standby state, the stored MPEG2 image data is read from HDD 3 and after it is encoded into the H.264 image data in transcoder 2, the re-recording processing in which decoder 1 stores again in HDD 3 is carried out.

In detail, decoder 1 sets multiplexer 45 so that it selects the MPEG2 image data from outside. HDD I/F 60 starts the storing processing of the MPEG2 image data from outside at the same time of the reading processing of the H.264 image data from HDD 3 described above. After this, this processing is carried out until both the instructed playback of the program of the H.264 image data and the instructed recording of the program of the MPEG2 image data from outside are completed.

In the above playback and recording processing, transcoder 2 carries out only the decoding of the H.264 image data and does not carry out the encoding processing. Decoder 1 only carries out the reading of the H.264 image data from HDD 3 and the storing of the MPEG2 image data to HDD 3 but does not carry out the decoding processing.

When both the processing is completed, in other words, in FIG. 4B, when the recording of the program of the MPEG2 image data is completed, or in FIG. 4C, when the playback of the program of the H.264 image data is completed, HDD I/F 60 reads the MPEG2 image data from HDD 3 and supplies it to A/V demultiplexer 61 via multiplexer 4. A/V demultiplexer 61 supplies the MPEG2 video data of the MPEG2 image data to MPEG2 video decoder 62 and supplies the audio data of the MPEG2 image data to audio decoder/encoder 64. MPEG2 video decoder 62 decodes the MPEG2 video data into normal video data and supplies it to H.264 video encoder 63. H.264 video encoder 63 encodes the normal video data into the H.264 video data. Audio decoder/encoder 64 encodes the audio data after decoding it into normal audio data. Multiplexer 66 generates the H.264 image data by combining the H.264 video data from H.264 video encoder 63 and the encoded audio data from audio decoder/encoder 64 and supplies it to HDD I/F 60 via multiplexer 45. HDD I/F 60 stores the supplied H.264 image data in HDD 3. After this, this processing is carried out during the instructed recording time. In the meantime, the reading of the MPEG2 image data from HDD 3 and the storing of the H.264 image data are carried out at the same time. When the storing of the H.264 image data is completed, the MPEG2 image data in HDD 3 is deleted or invalidate so that it can be overwritten later.

In the above processing, transcoder 2 carries out only the encoding processing of the H.264 image data and decoder 1 only carries out the reading of the MPEG2 image data from HDD 3 and the storing of the H.264 image data to HDD 3 but does not carry out the decoding processing.

Figure 5B:
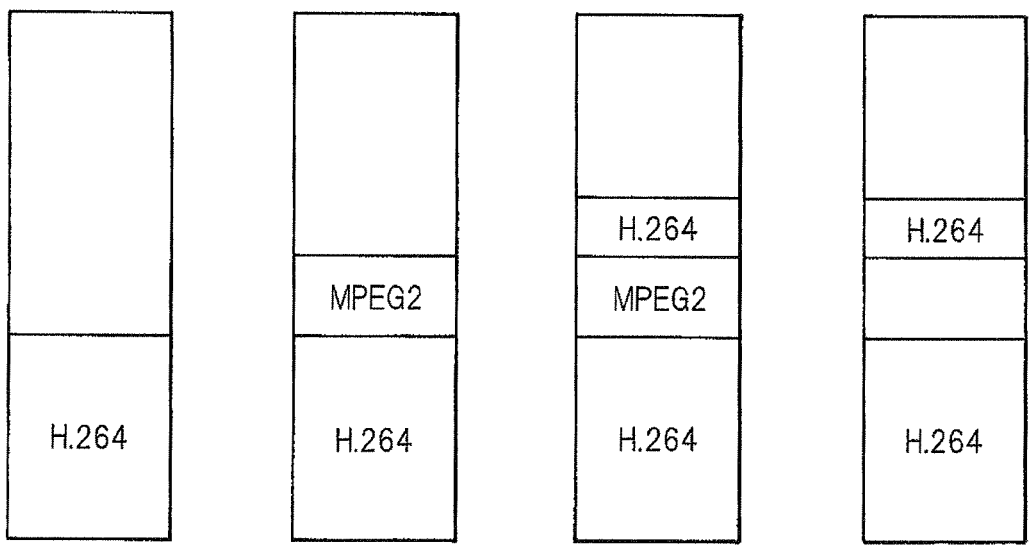

FIG. 5B is a diagram explaining the change of the stored data in HDD 3 at the time of simultaneous recording and playback. At first, only the H.264 image data is stored in HDD 3 and the reading of the H.264 image data is carried out in accordance with the playback instruction. Next, when the simultaneous recording is instructed, the storing of the MPEG2 image data of a new program is carried out in addition to the H.264 data stored so far. When the playback and recording are completed, the stored MPEG2 image data is read and new H.264 image data is generated therefrom and stored in HDD 3. At this time, as shown schematically, in HDD 3, the original H.264 image data and MPEG2 image data and the new H.264 image data are stored. When the re-recording is completed, the MPEG2 image data is deleted or invalidated.

The embodiments are described as above; however, the present invention is not limited to the above embodiments, but there can be various modification examples.

According to the techniques described above, it is possible to carry out recording and playback simultaneously without the need to change hardware in a system in which a semi-duplex transcoder of the second encoding format is combined with a decoder of the first encoding format. Due to this, it is possible to realize an image data recording/playback system of high-performance at a low cost.

The techniques described above can be applied to an image data recording/playback system in which a semi-duplex transcoder of the second encoding format is combined with a decoder of the first encoding format.

The present application will solve these problems and an object thereof is to make it possible to carry out recording and playback at the same time in a system in which a transcoder of the semi-duplex system employing a second encoding format is added to a decoder employing a first encoding format.

In order to achieve the above object, in an image data recording/playback device (system) according to the present application, a storage device is used as a buffer for recording or playing back image data encoded in the first encoding format, and a decoder records or plays back the image data encoded in the first format, i.e., the decoder records or plays back the image data encoded in the first format while inputting/outputting the image data encoded in the second format from/to the storage device, i.e., the decoder inputs/outputs the image data encoded in the first format from/to the storage device. The first and second formats may be any format, and for example, the first type may be the MPEG2 format and the second format may be the H.264 format, and hereinafter, an explanation is given on the assumption that the first format is the MPEG2 format and the second format is the H.264 format; however, this is not limited.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

I claim:

1. An image data recording/playback device, comprising: a decoder that decodes image data encoded in a first format; and
a transcoder configured to encode image data, supplied from the decoder and encoded in the first format, into a second format whose compression rate is higher than the compression rate of the first format and output the image data encoded into the second format to the decoder, decode input image data supplied from the decoder and encoded in the second format, output the decoded input image data to the decoder, and alternately carry out the encoding processing and the decoding processing, wherein:
the decoder inputs/outputs image data encoded in the first and second format to/from a storage device;
the transcoder employs a semi-duplex system capable of simultaneously carrying out only one of the processing in which image data encoded in the first format is encoded into the second format or the processing in which image data encoded in the second format is decoded; and
the decoder simultaneously inputs image data encoded in the first format from the storage device when outputting image data encoded in the second format to the storage device, and the decoder simultaneously outputs image data encoded in the first format to the storage device when inputting image data encoded in the second format from the storage device.

2. The image data recording/playback device according to claim 1, wherein the decoder outputs image data supplied from outside and encoded in the first format when outputting image data supplied from outside and encoded in the second format in the transcoder.

3. The image data recording/playback device according to claim 2, wherein when the decoder is outputting image data supplied from outside and encoded in the second format in the transcoder in accordance with an operation instruction, chasing playback processing, in which image data, supplied from outside and encoded in the first format is played back, is carried out.

4. The image data recording/playback device according to claim 3, wherein when the chasing playback processing is completed, the decoder deletes or invalidates image data supplied from outside and encoded in the first format and output during the chasing playback processing.

5. The image data recording/playback device according to claim 1, wherein the decoder reads image data output and encoded in the second format and supplies the read image data to the transcoder and when the transcoder is playing back image data supplied from the decoder and encoded in the second format, the decoder outputs image data supplied from outside and encoded in the first format in accordance with an operation instruction.

6. The image data recording/playback device according to claim 5, wherein:
the decoder inputs image data output at the same time of the playback of image data encoded in the second format and encoded in the first format and supplies the input image data to the transcoder when the transcoder is in the standby state;
the transcoder encodes the input image data, supplied from the decoder and encoded in the first format, into the second format and supplies the input image data encoded in the second format to the decoder; and
the decoder carries out re-recording processing in which image data supplied from the transcoder and encoded in the second format is output.

7. The image data recording/playback device according to claim 6, wherein the decoder deletes or invalidates image data encoded in the first format and output at the same time of the playback of image data encoded in the second format and during the period of the re-recording processing or after the re-recording processing is completed.

8. The image data recording/playback device according to claim 1, wherein the transcoder comprises a decoder to decode image data encoded in the first format and encodes the played-back image data into the second format.

9. An image data recording/playback system, comprising: a decoder that decodes image data encoded in a first format;
a transcoder that encodes image data, supplied from the decoder and encoded in the first format, into a second format having a compression rate higher than the compression rate of the first format and outputs the image data encoded in the second format to the decoder and, decodes input image data supplied from the decoder and encoded in the second format and outputs the decoded input image data to the decoder; and
a storage device that stores the image data, to/from which the image data is input/output via the decoder, wherein:
the decoder inputs/outputs image data encoded in the first and second formats to/from the storage device;
the transcoder employs a semi-duplex system capable of simultaneously carrying out only one of the processing in which image data encoded in the first format is encoded into the second format or the processing in which image data encoded in the second format is decoded; and
the decoder simultaneously inputs image data encoded in the first format from the storage device when outputting image data encoded in the second format to the storage device, and the decoder simultaneously outputs image data encoded in the first format to the storage device when inputting image data encoded in the second format from the storage device.

10. An image data recording/playback method for carrying out input/output of image data encoded in a first format and a second format to/from a storage device comprising:
  a decoder that decodes image data encoded in the first format; and
  a semi-duplex transcoder configured to encode image data, supplied from the decoder and encoded in the first format, into the second format having a compression rate higher than that of the first format and output the image data encoded in the second format to the decoder, decode input image data supplied from the decoder and encoded in the second format, output the decoded input image data to the decoder, and be capable of simultaneously carrying out only one of the encoding processing and the decoding processing,
  wherein when image data encoded in the second format is output to the storage device, image data encoded in the first format is simultaneously input from the storage device and when image data encoded in the second format is input from the storage device, image data encoded in the first format is simultaneously output from the storage device.

* * * * *